United States Patent [19]

Rennick

[11] 4,122,629
[45] Oct. 31, 1978

[54] DOCK SAFETY APPARATUS

[76] Inventor: Virgil G. Rennick, 2367 Miller Hwy., Olivet, Mich. 49076

[21] Appl. No.: 761,588

[22] Filed: Jan. 24, 1977

[51] Int. Cl.² .......................................... E05F 11/00
[52] U.S. Cl. ........................................ 49/357; 49/26; 49/70; 49/192; 188/32
[58] Field of Search ................. 49/357, 263, 264, 282, 49/26, 192, 70; 188/32

[56] References Cited

U.S. PATENT DOCUMENTS

| | | | |
|---|---|---|---|
| 1,493,317 | 5/1924 | Bernard | 49/264 X |
| 1,945,295 | 1/1934 | Pranger | 49/192 |
| 1,952,641 | 3/1934 | Vincent | 49/26 |
| 3,034,240 | 5/1962 | Holt | 49/264 X |
| 4,010,571 | 3/1977 | McGuire et al. | 49/263 X |

Primary Examiner—Philip C. Kannan

Attorney, Agent, or Firm—Blanchard, Flynn, Thiel, Boutell & Tanis

[57] ABSTRACT

A safety apparatus which includes a gate positioned adjacent the free edge of a loading dock and swingable between a substantially horizontal position wherein it is adapted to extend across the rear of a truck, and a vertical position permitting access between the dock and the truck. In a preferred embodiment, the swinging movement of the gate is controlled by an electrical switch mounted on a wheel chock located within the truck parking area. When a truck is positioned adjacent the dock, the chock is wedged in front of the truck tire. This causes activation of the switch so that a motor is energized to cause the gate to be swung upwardly into an approximate vertical position. Whenever the switch is released, as due to removal of the chock from engagement with the tire, then the motor is automatically reversely energized to swing the gate into its lowered horizontal position.

13 Claims, 4 Drawing Figures

DOCK SAFETY APPARATUS

FIELD OF THE INVENTION

This invention relates to safety apparatus for use with a loading dock to improve the safety of operating personnel utilizing powered equipment, such as a forklift, for loading or unloading a truck.

BACKGROUND OF THE INVENTION

As is well known, trucks are normally positioned in a parking area formed in front of an elevated dock, which dock is at an elevation similar to that of the truck bed, to facilitate loading or unloading of the truck. With this arrangement, the loading or unloading of the truck is normally carried out by utilization of operator-controlled motorized equipment, the most conventional form of which is a forklift. Even though this arrangement has been utilized for many years, nevertheless serious accidents still occur due to the forklift being driven off the dock, which accidents normally result in serious and often fatal injuries to the forklift operator. Many of these accidents occur due to the truck being driven away from the dock at the moment when the forklift operator is attempting to drive between the dock and the truck bed. The possibility of such an accident occurring is greatly increased due to the limited visibility experienced by the operator when a large load is positioned on the forklift. These accidents are obviously undesirable not only due to the extremely serious injuries to the operator, but they also expose the dock owner and/or the trucking company to severe financial expenditures for insurance and/or damages.

In recognition of the severity of this problem, the federal government has in recent years imposed new regulations which require that all loading docks be provided with a wheel chock located within the truck parking area, which wheel chock when positioned in wedging engagement with the rear truck tire prevents the truck from being driven away from the dock. However, even though the chock is readily available, it has been observed that many truck drivers fail to utilize the chock, either accidentally or due to the additional inconvenience caused thereby. Since the forklift operator often does not know if the wheel chock is in position, or if it has been removed, accidents of the above-mentioned type continue to occur.

Accordingly, it is an object of the present invention to provide a safety apparatus for use in conjunction with a loading dock so as to substantially prevent, or at least greatly reduce, accidents of the above-mentioned type. More specifically, the safety apparatus of the present invention includes a swingable gate positioned on and extending across the dock, which gate is movable upwardly into an open position only when a sensor disposed within the truck parking area indicates the presence of a truck positioned adjacent the dock.

Another object of the present invention is to provide a safety apparatus, as aforesaid, which in a preferred embodiment provides a sensor positioned within the wheel chock and activated only when the chock is properly positioned in wedging engagement with a truck tire, thereby insuring that the gate will be opened only when the truck is adjacent the dock and the chock is engaged with the tire. Release of the sensor, due to movement of the chock out of engagement with the tire causes the gate to automatically return to its closed position wherein it extends across the dock so as to prevent access into the truck.

A further object of the invention is to provide an improved safety apparatus, as aforesaid, which not only provides a more readily visible indication to the forklift operator as to the existence of the truck adjacent the dock for loading or unloading thereof, but also provides a visible indication to the operator as to the location of the edge of the dock (even when a truck is not located thereagainst) so as to prevent the operator from accidentally driving the forklift off the dock.

Other objects and purposes of the invention will be apparent upon reading the following specification and inspecting the accompanying drawings.

Figure 1:
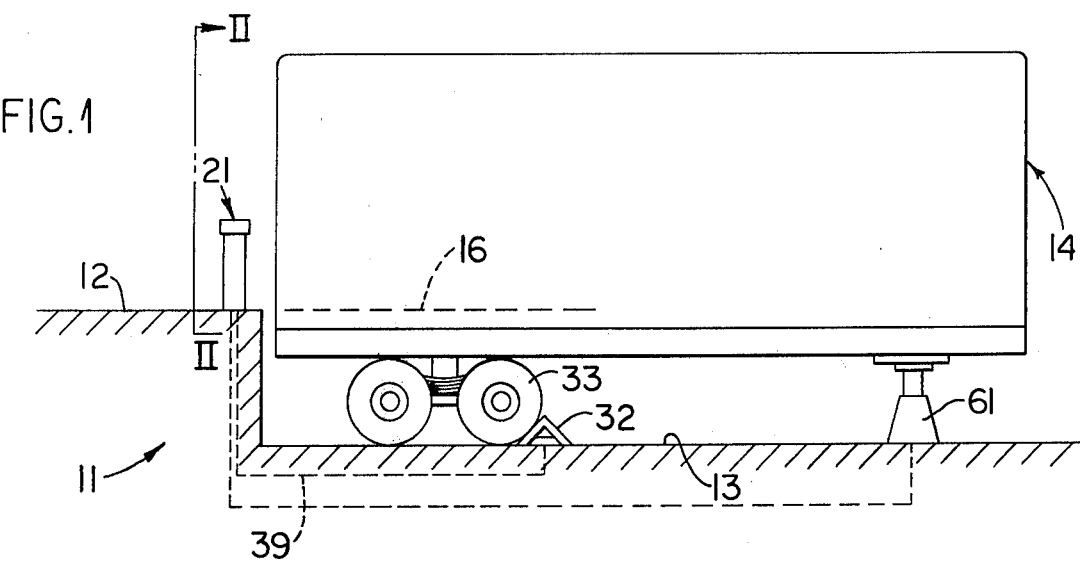
FIG. 1 is a side elevational view a truck positioned adjacent a dock, and illustrating utilization of the safety apparatus according to the present invention.

Certain terminology will be used in the following description for convenience in reference only. For example, the words "upwardly", "downwardly", "leftwardly" and "rightwardly" will refer to directions in the drawings to which reference is made. Said terminology will include the words specifically mentioned, derivatives thereof, and words of similar import.

SUMMARY OF THE INVENTION

The objects and purposes of the present invention, including those enumerated above, have been met by providing a safety apparatus which includes a swingable gate positioned adjacent the free edge of a loading dock and swingable between a substantially horizontal position wherein it is adapted to extend across the rear of a truck, and a vertical position permitting access between the dock and the truck. In a preferred embodiment, the swinging movement of the gate is controlled by a sensor, particularly an electrical switch, mounted on a wheel chock located within the truck parking area. When a truck is properly positioned adjacent the dock, the chock is wedged in front of the truck tire. This causes activation of the switch so that the motor which drives the gate is energized to cause the gate to be swung upwardly into an approximate vertical position. Whenever the switch is released, as due to removal of the chock from engagement with the tire, then the motor is automatically reversely energized to swing the gate into its lowered horizontal position wherein it extends along the edge of the dock across the truck opening.

DETAILED DESCRIPTION

Figure 2:
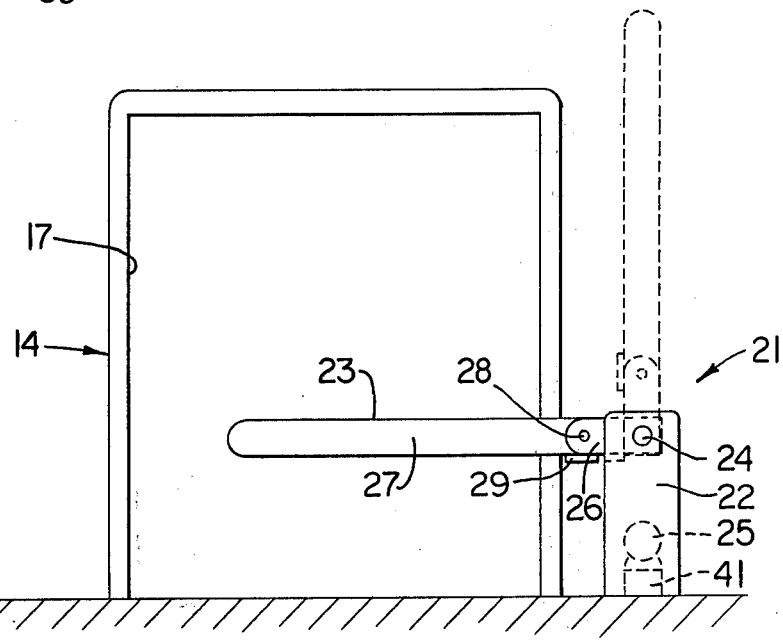
FIG. 2 is an enlarged end view taken substantially along the line II—II in FIG. 1.

Referring to FIGS. 1 and 2, there is illustrated a conventional loading dock 11 having an elevated substantially horizontal loading platform 12. A conventional truck parking area 13 (which may or may not be recessed in the ground depending upon the elevation of the platform 12) is provided in front of the loading dock to accommodate a conventional truck 14 therein. With this arrangement, the bed 16 of the truck is positioned at an elevation similar to that of the platform 12, whereby loading or unloading of the truck can be efficiently carried out through utilization of motorized equipment, such as a forklift. The forklift can be driven between the platform 12 and the bed 16 due to the access provided by the rear truck opening 17.

According to the present invention, the loading dock 11 is provided with a safety apparatus 21 so as to minimize the possibility of the forklift being accidentally driven off the edge of the platform. This safety apparatus 21 includes, as illustrated in FIG. 2, a support frame in the form of a pedestal 22 which is fixed to the support platform 12 and projects upwardly therefrom adjacent the free edge thereof. This pedestal 22 has a safety gate 23 swingably supported thereon for movement between a closed position wherein it extends horizontally along the edge of the dock and substantially across the rear of the truck, as illustrated by solid lines in FIG. 2, and a raised position wherein it extends approximately vertically (as illustrated by dotted lines in FIG. 2) so as to permit free access between the platform and the truck interior.

To permit swinging of the safety gate 23 between its open and closed (i.e. raised and lowered) positions, there is provided a driving mechanism which in the illustrated embodiment preferably comprises a bi-rotational electric motor 25 (FIG. 4) disposed within the pedestal 22 and drivingly interconnected through an intermediate gear reducer (not shown) to a drive shaft 24. The shaft 24, which is supported on the pedestal 22 for rotation about a substantially horizontal axis, is fixedly connected to the gate 23 for effecting swinging thereof.

The gate 23 is preferably of a multi-part construction and, as shown in FIG. 2, includes a short inner arm portion 26 which is non-rotatably secured to the drive shaft 24. An elongated outer arm portion 27 projects outwardly beyond the inner arm portion 26, and the adjacent overlapping ends of these arm portions are hingedly connected together, as by a hinge pin 28. A stop structure 29 is fixedly associated with the inner arm portion 26 and coacts with the outer arm portion 27 to normally maintain the outer arm portion 27 in radial alignment with the inner arm portion 26. This stop structure does, however, permit the outer arm portion 27 to freely swing upwardly (clockwise in FIG. 2) about the hinge 28 if necessary, such as due to the gate encountering an obstruction during the downward swinging thereof.

To control the activation of the gate, the preferred embodiment of the invention utilizes a sensor formed as an electrical switch 31 (FIG. 3) positioned on a wheel chock 32 which is maintained in the truck parking area 13 and is intended to be wedged into engagement with one of the tires 33 (FIG. 1) when the truck is positioned adjacent the loading platform. The chock 32 is of conventional construction and includes a tapered tire engaging surface 34 which extends upwardly at an incline with respect to the horizontal so as to be wedged into engagement with the front side of the tire.

Figure 3:
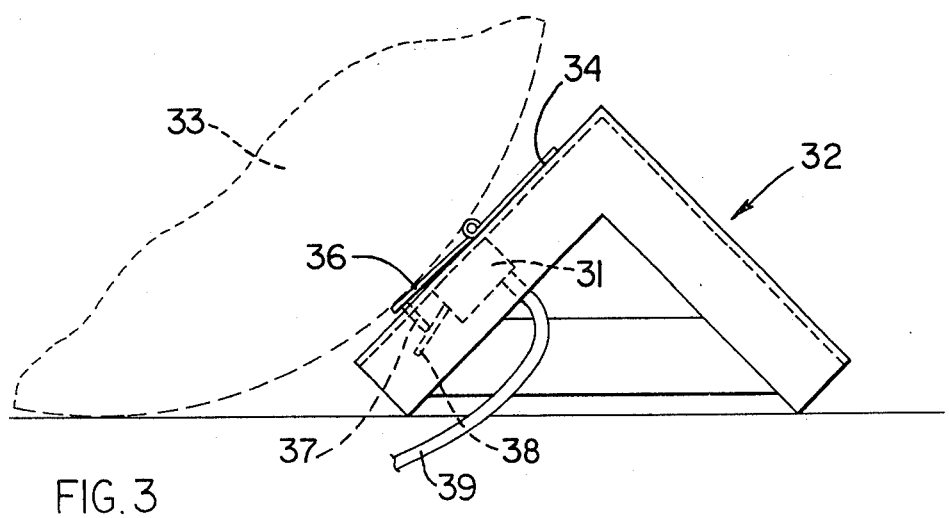
FIG. 3 is an enlarged side elevational view of a wheel chock incorporating therein a sensor, such as a switch.

The switch 31 is preferably mounted directly on the chock, as by being mounted on the underside thereof, and a suitable actuating mechanism cooperates between the switch and the tire so as to activate the switch only when the tire is properly engaged with the chock. One form of activating structure is illustrated in FIG. 3 and comprises a hinged flap 36 which is disposed on the tire engaging surface 34 and projects outwardly therefrom by a small distance, such as one-quarter to one-half inch. This flap 36 is disposed so as to contact the surface of the tire, such as approximately in the region where the tire surface is tangent to the chock surface 34. An actuating member 37 extends between the flap 36 and the switch 31, particularly the externally positioned switching lever 38. This actuating member 37 may assume many different forms, such as a rod slidably supported on the chock between the flap and the switch, or in the alternative a rodlike projection fixedly connected to the flap.

The flap 36 is normally urged outwardly into a position wherein it is spaced from the tire engaging surface 34, substantially as illustrated in FIG. 3. The flap may be normally maintained in this position either due to a spring structure disposed within the switch 31 or, if necessary, a separate spring may be provided for normally maintaining the flap in this released position. In this released position, the switch 31 is normally maintained open.

The switch 31 is connected, as by an electrical cable 38, to a suitable electrical control box 41 in which is provided appropriate circuitry for controlling the bi-rotational motor 25. This control box is also preferably positioned within the pedestal 22.

Figure 4:
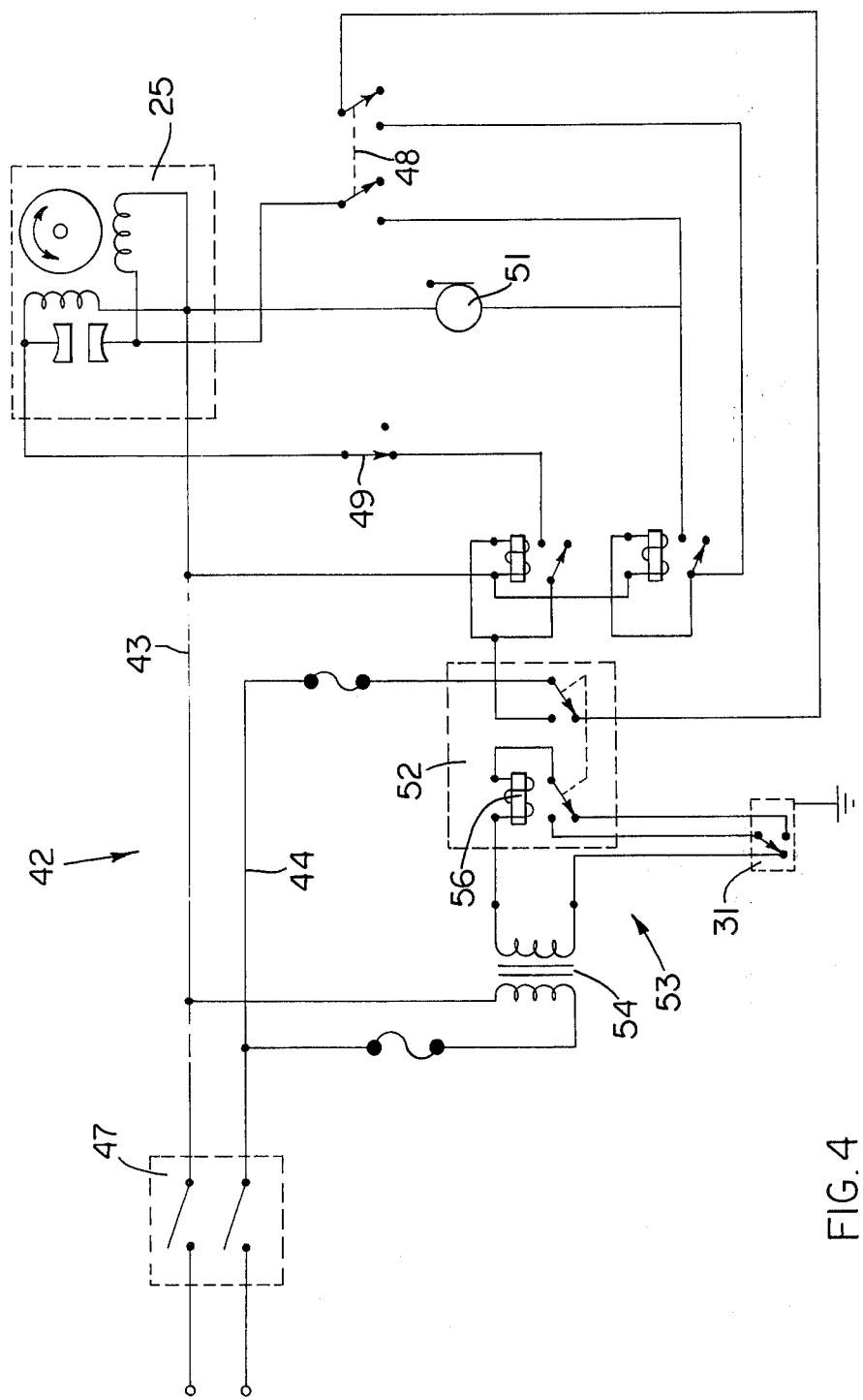
FIG. 4 illustrates one form of electircal circuitry suitable for use with the safety apparatus.

Referring now to FIG. 4, there is illustrated one form of an electrical circuit 42 suitable for use with the safety apparatus 21. A pair of electrical supply wires 43 and 44 are connected across a suitable potential source 46, such as a 110-volt source, and a manually operable control switch 47 is associated with these wires to permit the complete safety apparatus to be selectively turned on or off. These electrical wires are in turn associated with the bi-rotational electric motor 25 used for driving the gate. Suitable control circuitry connects these wires 43 and 44 to the motor to control the activation thereof. For example, a first normally-open limit switch 48 controls the downward swinging of the gate, which limit switch is contacted by the gate when it reaches its closed position so that the switch is closed to result in deenergization of the motor 25. Similarly, a second normally-closed limit switch 49 controls the upward swinging movement of the gate, which limit switch is engaged by the gate when it reaches its raised position so as to cause deenergization of the motor. There is also provided a buzzer or horn 51 which is energized to emit an audible signal only when the arm is being lowered.

The 110-volt circuitry utilized for energizing the driving motor, as explained above, is controlled by a double-pole control switch 52 which has one pole associated with the 110-volt circuit and the other pole associated with a low voltage control circuit 53. This low voltage control circuit 53 is associated with a transformer 54 which steps the voltage from the 110-volt circuit downwardly to a more safe operating level, such as 12 volts. This voltage can be more safely utilized since it is associated with the switch 31 mounted on the wheel chock 32, and is thus positioned outside and exposed to environmental conditions such as rain, snow and the like.

Since switch 31 is normally maintained in an open condition, and is closed only when the chock is positioned in engagement with the tire, closing of this switch permits the low voltage of the control circuit 53 to be supplied to the relay coil 56, which in turn causes shifting of the control switch 52 to effect appropriate energization of the main 110-volt control circuit. This thus energizes the motor 25 to cause lifting of the gate 23 until the limit switch 49 is contacted and opened, thereby deenergizing the motor. Similarly, as soon as the switch 31 is again opened, causing a reshifting of the control switch 52 into the position illustrated in FIG. 4, this results in automatic energization of the motor 25 so that it rotates in the reverse direction. This effects lowering of the gate 23 until the limit switch 48 is contacted and closed, thereby effecting deenergization of the motor.

It will be appreciated that numerous other control circuits can be designed for providing optimum control of the safety apparatus, substantially as explained above.

While the safety apparatus 21 is preferably designed for cooperation with the wheel chock 32, as explained above, the safety apparatus can also cooperate with other equipment used in association with the truck. For example, in many instances, a truck is parked at a loading dock and the tractor is disconnected, so that the truck then has the forward end thereof supported on one or more portable jacks. However, unless these jacks are properly secured to the truck, the loading of the truck can cause the trailer to slip or tip on the jack. This problem can also be substantially eliminated by incorporating into the jack 61, as illustrated in FIG. 1, a suitable switch or sensor similar to the switch 31 mounted on the wheel chock. The switch on the jack 61 will be closed only when the jack is properly engaged with the truck, and thus permits energization of the motor 25 and lifting of the gate 23 only when the jack is in proper engaging relationship with the truck. The operation of the overall safety apparatus, when operated by a sensor located on the jack, is thus the same as when the sensor is located on the wheel chock. Further, appropriate sensors can be provided on both the chock and jack, so that both of these devices can be used simultaneously whenever necessary.

Since the operation of the safety apparatus is believed self-evident from the structural and functional descriptions which have been set forth above, a further detailed explanation is hence not believed necessary.

To further increase the effectiveness of the safety apparatus 21, the swingable gate 23 is preferably of a bright color to improve the visibility thereof. The gate can also be provided with additional visible warning devices thereon, such as flags or flashing lights, if desired. However, inasmuch as the gate 23 extends along the edge of the platform throughout a substantial length, such as across at least the full width of the truck, this thus provides the forklift operator with a readily seen visual warning with respect to the edge of the loading platform. Further, this warning is visible even when a truck is positioned adjacent the dock so long as the chock 32 is not properly wedged against the tire. Further, during a loading or unloading operation, if the chock is accidentally or deliberately removed from beneath the tire, then the gate will again automatically lower into its closed position, which will also be accompanied by the sounding of the horn or buzzer, so that the forklift operator will be immediately informed that it is no longer safe to drive the forklift off of the loading platform.

While the disclosed embodiment uses a sensor 31 in the form of a mechanically-actuated electrical switch, it will be appreciated that the sensor 31 may be of other forms so as to sense the presence of the truck. For example, the sensor 31 may be an optical-electrical device employing a photocell or the like for sensing the truck's presence. As a further alternative, the sensor 31 can be a remote switching structure which is not directly connected to the motor, but which when activated emits a radio frequency signal for activating the motor.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A safety device for use with a loading dock having a substantially horizontal loading platform terminating adjacent a truck parking area which is at an elevation below said platform so that a truck positioned within said parking area has the bed thereof and the loading platform at similar elevations, said safety apparatus comprising:

a stationary frame structure adapted to be fixedly related with respect to said loading dock;

an elongated cantilevered gate swingably movable supported on said frame structure for swinging movement between a raised substantially upright position and a lowered substantially horizontal position, said gate when in said lowered position extending along the loading dock in a direction approximately parallel with the edge thereof and being spaced upwardly above the loading platform, said gate when in said lowered position also being positioned adjacent said edge and extending at least partially across that portion of the loading platform which provides direct access to the parking area;

drive means interconnected to said gate for causing selective swinging movement thereof between said raised and lowered positions;

sensing means associated with said parking area for sensing the presence of a stationarily positioned truck within said parking area in close proximity to said loading dock, said sensing means being maintained in an operative condition so long as it senses the presence of a stationary truck within said parking area in close proximity to said loading dock, said sensing means being maintained in an inoperative condition so long as it does not sense the presence of a stationary truck within said parking area in close proximity to said loading dock; and control means responsive to said sensing means for causing energization of said drive means, said control means energizing said drive means to effect swinging of said gate means into said raised position whenever said sensing means is in said operative condition, and said control means energizing said drive means for automatically swinging said gate means into said lowered position whenever said sensing means is in said inoperative condition.

2. An apparatus according to claim 1, including truck engaging means movably disposed within said parking area and being selectively positionable for engaging a truck when same is located within said parking area in close proximity to said loading dock, said truck engaging means comprising chock means adapted for engagement with a truck tire, and said sensing means coacting with said chock means so as to be in said operative condition only when said chock means is in engagement with said truck tire.

3. An apparatus according to claim 1, including a truck engaging device movably disposed within said parking area and being selectively positionable within said parking area for engaging a truck which is stationarily parked within said parking area, and said sensing means being maintained in said operational condition only when said truck engaging means is disposed in engagement with said truck.

4. An apparatus according to claim 3, wherein said sensing means is mounted on said truck engaging means, and wherein said connecting means includes elongated flexible conduit means connected to said truck engaging means for permitting the latter to be selectively moved about within said parking area.

5. A safety apparatus for use with a loading dock having a substantially horizontal loading platform terminating adjacent a truck parking area which is at an elevation below said platform so that a truck positioned within said parking area has the bed thereof and the loading platform at similar elevations, said safety apparatus comprising:

a stationary frame structure adapted to be fixedly related with respect to said loading dock;

gate means movably supported on said frame structure for swinging movement between a raised substantially vertical position and a lowered substantially horizontal position, said gate means when in said lowered position extending along said loading dock in a direction approximately parallel with the edge thereof and being spaced upwardly above the loading platform;

drive means interconnected to said gate means for causing selective swinging movement thereof between said raised and lowered positions;

truck engaging means movably disposed within said parking area and being selectively positionable for engaging a truck when same is located within said parking area, said truck engaging means comprising chock means adapted for engagement with a truck tire;

sensor means mounted on said truck engaging means for sensing the presence of a truck, said sensor means being normally maintained in an inoperative condition when said chock means is disengaged from the truck tire, and said sensor means being disposed in an operative condition due to engagement of said chock means with said truck tire; and connecting means cooperating between said sensor means and said drive means for causing energization thereof to effect swinging of said gate means into said raised position whenever said sensor means is in said operative condition due to engagement of said chock means with said truck tire, said connecting means causing energization of said drive means for effecting lowering of said gate means into said lowered position whenever said sensor means is in said inoperative condition.

6. An apparatus according to claim 5, wherein said gate means comprises an elongated arm structure which is hingedly supported at one end thereof on said frame structure for swinging movement within a substantially vertical plane between said raised and lowered positions, said elongated arm structure including a first arm portion which is rather short and has one end thereof hingedly supported with respect to said frame structure, said first arm portion being drivingly interconnected to and swingably moved by said drive means, said elongated arm structure including a second arm portion which is several times longer than said first arm portion and has one end thereof hingedly connected to the other end of said first arm portion, a hinge structure coacting between the connected ends of said first and second arm portions for permitting said second arm portion to be freely vertically swung upwardly with respect to said first arm portion, and stop means coacting between said first and second arm portions for normally maintaining same in substantially aligned relationship with one another, whereby application of an upwardly directed external load to said second arm portion permits same to freely swing upwardly relative to said first arm portion about said hinge structure.

7. An apparatus according to claim 5, including audible warning means energizable whenever said gate means is being swingably moved downwardly toward its lowered position.

8. An apparatus according to claim 5, wherein said frame structure includes an upright pedestal structure fixed to said dock and projecting upwardly from said loading platform in the vicinity of the free edge thereof, said gate means comprising an elongated lever arm structure swingably mounted on said pedestal structure for swinging movement within a vertical plane which is disposed adjacent and extends substantially parallel with the free edge of the loading platform, said drive means including electric motor means mounted on said pedestal structure and drivingly interconnected to said arm structure to effect the desired swinging thereof, said sensor means comprising electrical switch means mounted on said truck engaging means, and said connecting means comprising electrical circuitry means operatively interconnected between said switch means and said motor means, said circuitry means including elongated flexible electric cable means interconnected to said switch means to permit said truck engaging means to be selectively moved about within said parking area.

9. An apparatus according to claim 8, wherein said electrical circuitry means includes a first circuit of approximately 110 volts operatively connected to said electric motor means, and a second circuit having a voltage several times smaller than said first circuit and operatively connected to said switch means.

10. An apparatus according to claim 5, wherein said sensor means includes a sensor member movably supported on said chock means and positioned for engagement with said truck tire, said sensor member being normally maintained in an inoperative position corresponding to said inoperative condition when disengaged from the truck tire, and said sensor member being moved into an operative position corresponding to said operative condition due to engagement with said truck tire.

11. An apparatus according to claim 5, wherein said sensor means comprises switching means mounted on said chock means and having a movable switching element.

12. An apparatus according to claim 11, wherein said switching means comprises an electrical-type switch which is moved into said operative position in response to engagement of said chock means with a tire, said drive means including an electric motor, and said connecting means including electrical circuit means connected between said switch and said motor for effecting selective energization of said motor.

13. An apparatus according to claim 12, wherein said electrical circuit means includes a first electrical circuit interconnected to said motor, said first electrical circuit being of conventional voltage, said circuit means including a second electrical circuit connected to said switch, said second electrical circuit being of a voltage substantially lower than said first circuit, and transformer means operatively coupled between said first and second circuits for effecting a voltage reduction therebetween.

* * * * *